(12) United States Patent
Douglas et al.

(10) Patent No.: US 8,577,712 B2
(45) Date of Patent: Nov. 5, 2013

(54) ASSESSING RISK

(75) Inventors: William J. Douglas, Wayne, PA (US); Amanda Ness, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 946 days.

(21) Appl. No.: 12/114,550

(22) Filed: May 2, 2008

(65) Prior Publication Data

US 2009/0276260 A1 Nov. 5, 2009

(51) Int. Cl.
*G06Q 10/00* (2012.01)

(52) U.S. Cl.
USPC ....... 705/7.22; 705/7.12; 705/7.13; 705/7.15; 705/7.16; 705/7.23; 705/7.28

(58) Field of Classification Search
USPC ........... 705/7.22, 7.12, 7.13, 7.14, 7.15, 7.16, 705/7.18, 7.23, 7.28
See application file for complete search history.

(56) References Cited

U.S. PATENT DOCUMENTS

| | | | | |
|---|---|---|---|---|
| 5,016,170 | A * | 5/1991 | Pollalis et al. | 705/7 |
| 5,408,663 | A * | 4/1995 | Miller | 718/104 |
| 6,115,642 | A * | 9/2000 | Brown et al. | 700/104 |
| 6,519,763 | B1 * | 2/2003 | Kaufer et al. | 717/101 |
| 7,349,863 | B1 * | 3/2008 | Pena-Mora et al. | 705/8 |
| 7,415,393 | B1 * | 8/2008 | Pena-Mora et al. | 705/9 |
| 2003/0101089 | A1 | 5/2003 | Chappel et al. | |
| 2004/0054563 | A1 | 3/2004 | Douglas | |
| 2005/0283751 | A1 | 12/2005 | Bassin et al. | |
| 2006/0136328 | A1 * | 6/2006 | Angermeier | 705/38 |
| 2006/0167736 | A1 * | 7/2006 | Weiss | 705/9 |
| 2006/0212325 | A1 * | 9/2006 | Levanon | 705/7 |
| 2007/0288283 | A1 * | 12/2007 | Fitzpatrick | 705/8 |
| 2008/0004926 | A1 * | 1/2008 | Horvitz et al. | 705/7 |
| 2008/0082388 | A1 * | 4/2008 | Fishman | 705/8 |
| 2008/0114625 | A1 * | 5/2008 | Kline et al. | 705/7 |
| 2008/0177526 | A1 * | 7/2008 | Kano et al. | 703/22 |
| 2008/0270213 | A1 * | 10/2008 | Christodoulou et al. | 705/8 |
| 2009/0216602 | A1 * | 8/2009 | Henderson | 705/9 |

OTHER PUBLICATIONS

Finley et al., "Project Scheduling Risk Assessment Using Monte Carlo Methods," Oct. 1994, Cost Engineering; vol. 36, No. 10; pp. 24-28.*
Isidore, et al., "Integrated probabilistic schedules and estimates from project simulated data," 2001, Construction Management and Economics, vol. 19, pp. 417-426.*
Kostetsky, Oleh, "A Simulation Approach for Managing Engineering Projects," 1986, IEEE, Proceedings of the 1986 International Conference on Robotics and Automation, pp. 318-324.*
Browning, et al., "Modeling Impacts of Process Architecture on Cost and Schedule Risk in Product Development," Nov. 2002, IEEE Transactions on Engineering Management, vol. 49, No. 4, pp. 428-442.*
Finley., "Project Scheduling Risk Assessment Using Monte Carlo Methods," Oct. 1994, Cost Engineering; vol. 36, No. 10; pp. 24-28.*
Padberg, "A Fresh Look at Cost Estimation, Process Models and Risk Analysis," 1999, In Proc. EDSER 1—First Workshop on Economics-Driven Software Engineering Research.*

* cited by examiner

*Primary Examiner* — Andre Boyce
*Assistant Examiner* — Ivan R Goldberg

(57) ABSTRACT

Systems, methods, and apparatus, including software tangibly stored on a computer readable medium, involve a future deadline for completion of a project milestone. An estimate of an amount of time slippage associated with the future deadline is received. A probability of missing the future deadline is calculated based on the estimated amount of time slippage and an amount of time remaining until the future deadline.

10 Claims, 5 Drawing Sheets

ASSESSING RISK

BACKGROUND

This description relates to assessing risk, particularly in the area of project management.

An enterprise, such as a business, an organization, or an individual, may be exposed to one or more risks as a result of enterprise operations. For example, there may be some unknown or uncertain costs associated with engaging in a particular enterprise project. An enterprise's assessment of risks can be useful in making decisions related to future or current activities of the enterprise. For example, the enterprise may consider how engaging a particular project would impact the enterprise as a whole.

An enterprise may also be exposed to one or more risks associated with administering or completing a project that is undertaken. For example, failure to complete a project in a timely manner may place the enterprise at risk of reputational or financial loss.

SUMMARY

A future deadline for completion of a project milestone is identified. An estimate of an amount of time slippage associated with the future deadline is received. A probability of missing the future deadline is calculated based on the estimated amount of time slippage and an amount of time remaining until the future deadline.

Implementations can include one or more of the following features. The probability is calculated based on a ratio of the estimated amount of time slippage and an allocated amount of time to complete the project milestone. The amount of time to complete the project milestone includes a sum of the time remaining until the future deadline and the estimated amount of time slippage. A risk level associated with the project milestone is determined. The risk level is based on the calculated probability and a measure of a cost associated with missing the future deadline. A project timeline is identified, and the future deadline includes one of a plurality of future deadlines for the project timeline. The future deadline can be a project deadline or a future date. The amount of time remaining until the future deadline is the number of days between a current date and the future date. The calculated probability is presented on a user interface. A coordinate system is presented on a user interface, and the coordinate system includes a data point representing the project milestone. The coordinate system includes a first dimension representing a range of probabilities of missing one or more deadlines and a second dimension representing a range of costs associated with missing the one or more deadlines. The data point is located at the coordinates corresponding to the calculated probability of missing the future deadline and to a measure of a cost associated with missing the future deadline. The data point comprises a color coded representation determined according to a risk level associated with the project milestone. The risk is compared to one or more thresholds. A notification is issued based on the comparison. The described techniques can be implemented in methods, systems, apparatus, computer program products, or otherwise, tangibly stored on a computer readable medium as instructions operable to cause programmable processor to perform actions.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
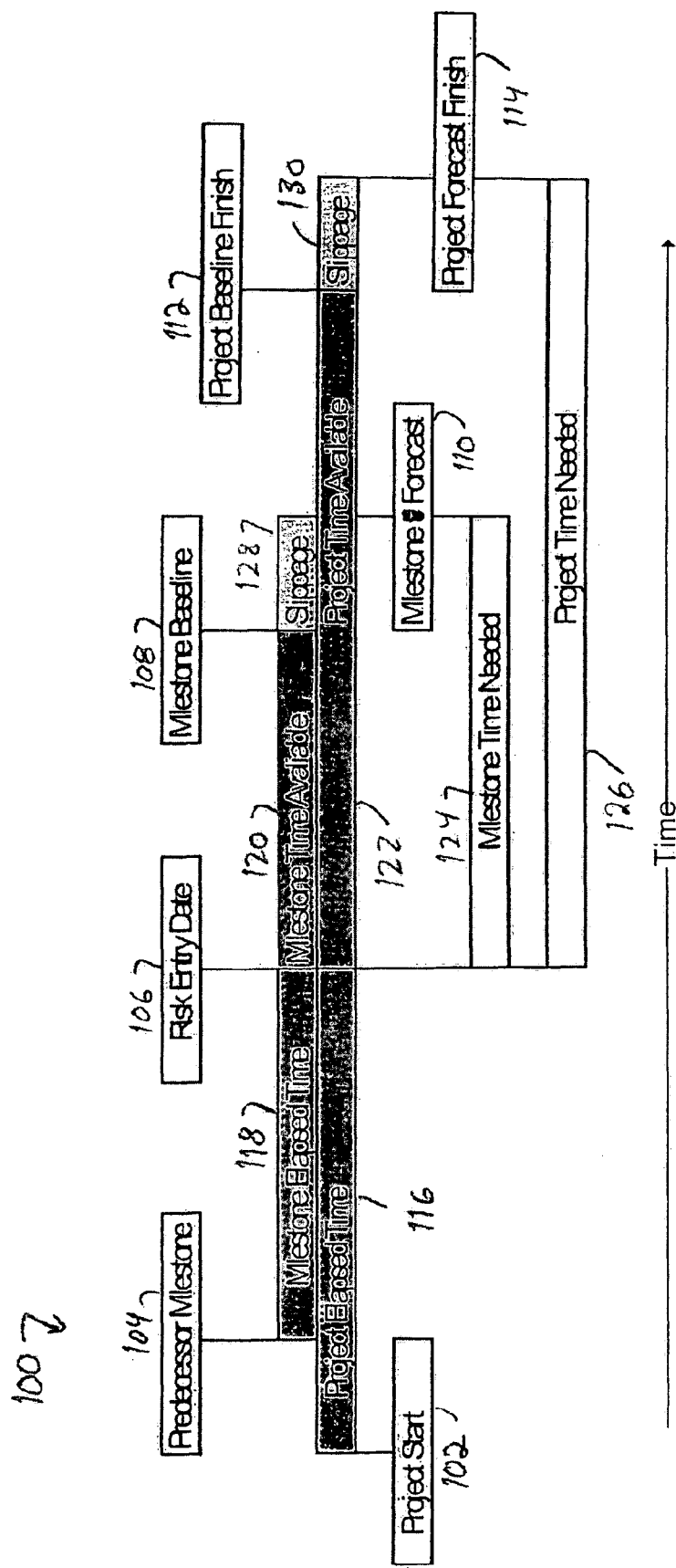
FIG. 1 is a diagram illustrating an example project timeline.
Figure 2:
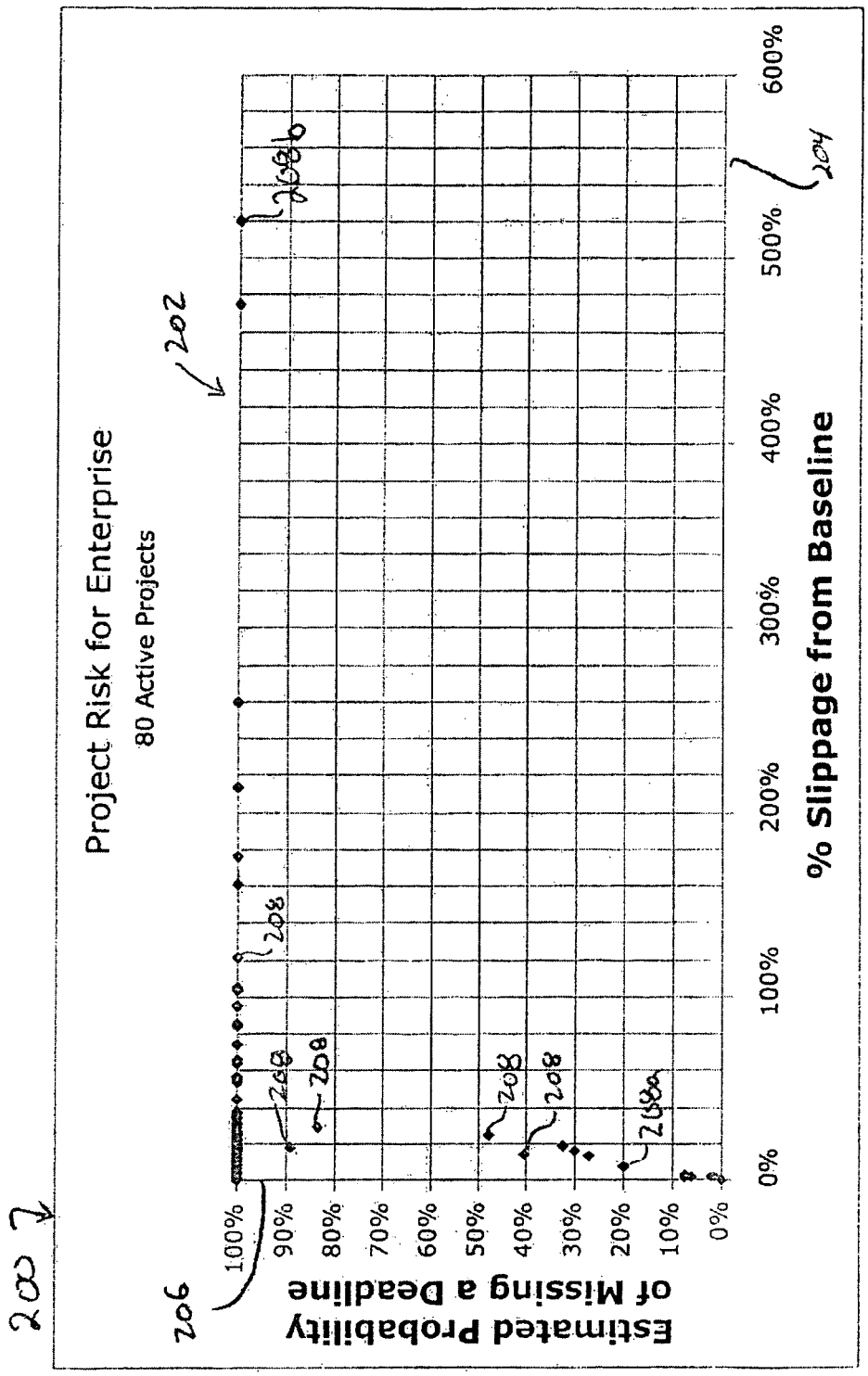
FIG. 2 is an example coordinate system and example data for assessing risk.

FIG. 1 is a diagram illustrating an example project timeline 100. The project timeline 100 presents data related to an example project. In some implementations, the project is a project of an enterprise or a project of a department, individual, team, or committee within an enterprise. The project timeline 100 can be used to assess one or more risks associated with the example project. For example, the project timeline 100 can be used to assess risks associated with individual milestones within the project and/or the project as a whole. Project timelines can be used to generate and compare data for assessing risks related to multiple projects of the enterprise. For example, FIG. 2 is an example of data for assessing risks associated with 80 projects in an enterprise.

The example project represented by the timeline 100 in FIG. 1 is broken down into multiple project milestones. The example project milestones represent the scheduled or anticipated completion of tasks or sub-projects within the example project. In some cases, there may be one or more risks associated with missing a deadline, such as a milestone deadline. For example, there may be some added project cost associated with missing the milestone deadline. In some implementations, data included in the project timeline 100 can be used to consistently and transparently calculate an estimated probability of missing one or more deadlines in the example project. Data included in the project timeline 100 can be used to calculate a probability of missing a future deadline for a project milestone, based on an estimated amount of time slippage associated with the project milestone and an amount of time remaining until the future deadline. A risk level associated with the project milestone can be determined based on the calculated probability and a measure of a cost associated with missing the future deadline.

The project timeline 100 includes multiple event markers 102, 104, 106, 108, 110, 112, and 114. Each event marker represents an event related to the example project and identifies a time on the timeline 100 associated with the event. An event marker can identify a time on the timeline 100, for example, by a specific date, by a specific date and time of day, or a range of dates and/or times. An event marker can identify a time in the past when an event actually happened, a time in the past when an event was scheduled to happen, a present time, a time in the future when an event is scheduled to happen, a time in the future when an event is forecast to happen, or any other time in the past, present, or future associated with an event or milestone related to the project. In the illustrated example, the event markers are time-ordered starting with the project start event marker 102 (on the left in the diagram) and ending with the project forecast finish event marker 114 (on the right in the diagram). The risk entry date event marker 106 identifies a current time, such that event markers 108, 110, 112, and 114 represent future events and the event markers 102 and 104 represent past events.

The project start event marker 102 represents the beginning of the example project. The predecessor milestone event marker 104 represents a previously-completed milestone in the example project. The risk entry date event marker 106 represents the point in the timeline 100 at which risk is assessed for the example project. The risk entry date event marker 106 can additionally or alternatively represent entry and/or update of one or more risk-assessment parameters. The milestone baseline event marker 108 represents the scheduled completion of a project milestone that is currently pending (i.e., as of the time identified by the risk entry date event marker 106). The milestone forecast event marker 110 represents the forecasted completion of the pending project milestone. The project baseline finish 112 represents the scheduled completion of the example project. The project forecast finish 114 represents the forecasted completion of the example project.

The example timeline 100 also includes time difference indicators 116, 118, 120, 122, 124, 126, 128, and 130. Each of the example time difference indicators identifies an amount of time between two events represented by event markers in the project timeline 100. The project elapsed time indicator 116 represents the amount of time between the project start event marker 102 and the risk entry date event marker 106. The milestone elapsed time indicator 118 represents the amount of time between the predecessor milestone event marker 104 and the risk entry date event marker 106. The milestone time available indicator 120 represents the amount of time between the risk entry date event marker 106 and the milestone baseline event marker 108. The project time available indicator 122 represents the amount of time between the risk entry date event marker 106 and the project baseline finish event marker 112. The milestone time needed indicator 124 represents the amount of time between the risk entry date event marker 106 and the milestone forecast event marker 110. The project time needed indicator 126 represents the amount of time between the risk entry date event marker 106 and the project forecast finish event marker 114. The milestone slippage indicator 128 represents the amount of time between the milestone baseline event marker 108 and the milestone forecast event marker 110. The project slippage indicator 130 represents the amount of time between the project baseline event marker 112 and the project forecast finish event marker 114.

In some cases, slippage refers to an amount of time between a scheduled milestone deadline and a milestone forecast finish dates. For example, before beginning work on the project or before beginning work on the milestone, a schedule may be laid out to identify deadlines for completion of some or all of the project milestones and/or the entire project. The schedule may reflect an estimated amount of time needed to complete each milestone or simply an amount of time allocated for completion of each milestone. Before a milestone is completed, an estimated milestone forecast finish time can be calculated or otherwise identified. If the estimated milestone forecast finish time occurs after the deadline for completing the milestone, this can be an indication of milestone slippage. In this example, the slippage can be the amount of time between the estimated milestone forecast finish time and the deadline for completing the milestone. In an illustrative example, the deadline for completing a milestone is Jan. 3, 2009, the estimated milestone forecast finish time is Mar. 3, 2010, and the milestone slippage is one year and two months.

In some cases, slippage refers to an amount of time that work on the milestone is behind schedule. For example, work on a project milestone can include a number of tasks and/or sub-projects. Progress toward completing the milestone can include completing the tasks and/or sub-projects at certain pre-designated deadlines or in a certain pre-allotted amount of time. In the case that one or more of the tasks and/or sub-projects is completed after the pre-designated deadline, and/or in the case that one or more of the tasks and/or sub-projects consumes more than the pre-allotted amount of time, this can be an indication of milestone slippage. In this example, the slippage can be any combination of the total amount of time that the tasks and/or sub-projects consume beyond the total amount of time pre-allotted to the tasks and/or sub-projects and the total amount of time that the tasks and/or sub-projects consume beyond the deadlines pre-designated to the tasks and/or sub-projects. In one example, completing a milestone may require completing three tasks that are each allotted two days for completion. If the first task takes seven days to complete, the milestone slippage is five days.

In some cases, slippage refers to an amount of time based on previous, current, and/or future delays in working on the milestone. In some cases, work toward completion of the milestone may be stopped or slowed due to supply or personnel shortages. In some cases, work toward completion of the milestone may be stopped or slowed due to unpredictable factors such as weather and/or natural phenomena. If work on a milestone is stopped or slowed for an amount of time, this can be an indication of milestone slippage. In this example, the slippage can include the amount of time for which work is stopped or slowed. As an example, work toward completing a milestone is stopped for one day due to a snowstorm, and the slippage is one day.

Slippage may also be estimated based on additional or new information gathered or obtained during work on a project. For example, unanticipated tasks may be required to complete a particular milestone, and an estimated time to complete the additional tasks may correspond to the slippage.

In some cases, slippage refers to a combination of factors. For example, slippage can refer to a combination of factors described above. Two examples of slippage are milestone slippage and project slippage. Milestone slippage can represent slippage with regard to a milestone deadline, while project slippage can represent slippage with regard to a project deadline. Milestone slippage, in some implementations, is assumed to persist until the end of a project unless action is taken to reduce or eliminate the slippage. In other implementations, a percentage of milestone slippage is assumed to persist until the end of the project, which may result in a larger or smaller estimate of total project slippage relative to the milestone slippage.

The example timeline 100 can be generated based on information from one or more of a variety of sources. For example, parameters of event markers (e.g., project start, predecessor milestones, risk entry date, current and future milestone baselines, project baseline finish, and others) and/or parameters of time difference indicators (e.g., milestone elapsed time, milestone time available, milestone time needed, project elapsed time, project time available, project time needed, milestone slippage, project slippage, and others) can be identified and/or determined based on information received from one or a combination of different sources. Example sources of timeline data include data entry by one or more project managers, receiving data over a network from one or more remote sources, extracting data from one or more base systems, calculating data using an information processor, accessing data stored in a computer memory or machine-readable storage medium, reading a date and/or time from a system clock, and others. Example base systems include database applications, software applications, and other computer applications, which may store or analyze accumulated historical project data and/or perform calculations relating to a current project schedule in view of such historical project data.

The project timeline 100 depicted in FIG. 1 is one example of a project timeline. Some implementations of a project timeline can include one or more variations. In example timeline 100, the risk entry date event marker 106 identifies a current date or time when risk is assessed and/or when some or all of the risk-assessment parameters are updated and/or entered. In some cases, the risk entry date event marker 106 can identify a past (or future) date or time when risk was (or will be) assessed and/or when some or all of the risk-assessment parameters were (or will be) updated and/or entered. In the example timeline 100, the milestone time available indicator 120, the milestone time elapsed indicator 118, the milestone time needed indicator 124, and milestone slippage indicator 128 are only provided for a single current milestone. In some cases, these parameters can be identified for multiple past, present, and/or future milestones. Some implementations of a project timeline omit one or more features included in the example timeline 100. For example, one or more of the illustrated event markers and/or one or more of the illustrated time difference indicators may be omitted.

The information represented in a project timeline, such as the example project timeline 100, can be used to assess risk associated with the project and/or one or more project milestones. For example, the enterprise may encounter added project costs as a result of missing a project milestone deadline, and the added project cost represents a risk to the enterprise. In some cases, the risk associated with the added cost is the added cost times the probability of incurring the added cost. In some cases the information represented in a project timeline can be used to conveniently estimate a probability of missing one or more deadlines, thereby identifying a probability of encountering the cost associated with missing the deadline. In some cases the information represented in a project timeline can be used to conveniently estimate a cost of missing one or more deadlines.

The amount of slippage and the amount of time available to mitigate slippage can affect the likelihood of completing the milestone on time. In this regard, milestone slippage and milestone time available can be used to estimate a likelihood of missing the milestone deadline. A comparison of two example cases illustrates this concept. In a first example case, there is one day of milestone slippage and three weeks until the milestone deadline. In a second example case, there is one day of milestone slippage and one day until the milestone deadline. The likelihood of mitigating one day of milestone slippage (and thus, meeting the milestone deadline) may be higher in the first case, where there are three weeks of milestone time available, than in the second case, where there is only one day of milestone time available.

This concept can be expressed mathematically. The probability $PM_{late}$ of missing a milestone deadline can be estimated according to $$PM_{late} = 1 - PM_{on\ time} = 1 - \frac{MTA}{MTN} = 1 - \frac{MTA}{(MTA+MS)} = \frac{MS}{(MTA+MS)} \quad (1)$$

where $PM_{on\ time}$ refers to the probability of not missing the milestone deadline, Milestone Time Available (MTA) refers to an amount of time until the milestone deadline, MS refers to an amount of milestone slippage, and Milestone Time Needed (MTN) refers to the sum MTA+MS. The first equality in equation (1), $PM_{late}=1-PM_{on\ time}$, represents conservation of probability. The quantities represented in equation (1) can be estimated or calculated based on data represented in a project timeline, such as the example project timeline 100. Equation (1) provides an estimate of the probability that the project milestone will be completed late.

A modified version of equation (1) can also be used to calculate $PP_{late}$, the probability of missing the project deadline. For example, by substituting Project Time Available (PTA) for MTA, Project Time Needed (PTN) for MTN, and Project Slippage (PS) for MS, equation (1) becomes $$PP_{late} = 1 - PP_{on\ time} = 1 - \frac{PTA}{PTN} = 1 - \frac{PTA}{(PTA+PS)} = \frac{PS}{(PTA+PS)} \quad (2)$$

Equation (2) can provide an estimate of the probability that the project will be completed on time.

Other quantities, such as Percent Milestone Slippage (PMS) and Percent Project Slippage, can also be calculated based on a project timeline. For example, $$PMS = \frac{MS}{(MET+MTA)} \quad (3)$$

and $$PPS = \frac{PS}{(PET+PTA)}, \quad (4)$$

where MET refers to the Milestone Elapsed Time, and PET refers to the Project Elapsed Time. The PMS and PPS can be useful for assessing project risk. For example, in some cases PMS and PPS can be used to estimate an additional cost that will be incurred if the slippage is not mitigated, while $PM_{late}$ and $PP_{late}$ can be used to estimate a risk of incurring such costs and/or a cost probability.

As illustrated in FIG. 2, the calculated probabilities $PM_{late}$ and/or $PP_{late}$ and the calculated percentages PMS and/or PPS can be used to generate a display 200 for assessing project risk for one or more projects of an enterprise. The display 200 can be presented, for example, on a user interface to a user of a computer system. The example display 200 includes a two-dimensional coordinate system 202 with data points 208 that each represent a project milestone. Each project milestone represented by a data point 208 has a milestone deadline, or milestone baseline. The first dimension of the coordinate system 202, along the vertical axis 206, represents a range of probabilities of missing the milestone deadline. The second dimension of the coordinate system 202, along the horizontal axis 204, represents a range of costs associated with missing the milestone deadline. Each data point 208 is located at the vertical coordinate corresponding to the estimated probability of missing the milestone deadline and the horizontal coordinate corresponding to the estimated cost associated with missing the milestone deadline. In some implementations of a display for assessing risk, each data point 208 comprises a visual representation determined according to a risk level associated with the project milestone. Examples of a visual representation include a color code, a shape, a label, and/or others. In some implementations, the horizontal axis represents increased costs or loss of revenue associated with missing the milestone.

In the example display 200, the estimated probability of missing each milestone deadline is calculated according to equation (1) above, and the estimated cost of missing each milestone deadline is calculated according to equation (3) above. In some implementations of a display for assessing risk, the data points 208 represent project deadlines, a first dimension represents a range of probabilities of missing the project deadlines, and a second dimension represents a range of costs associated with missing the project deadlines. In such an implementation, the estimated probability of missing the project deadline can be calculated according to equation (2) above, and the estimated cost of missing the project deadline can be calculated according to equation (4) above.

The display 200 is one example of a display for assessing risks. Some implementations of a display for assessing risk include one or more variations. For example, the cost associated with missing a deadline (represented by the horizontal dimension) can be estimated, calculated, or otherwise identified by a variety of suitable methods, and the equations (3) and (4) above are only examples. Also, the probability of missing a deadline (represented by the vertical dimension) can be estimated, calculated, or otherwise identified by a variety of suitable methods, and the equations (1) and (2) above are only examples. In some cases, the estimated probability is represented on the horizontal or a different axis, and the estimated cost is represented on the vertical or a different axis. The example coordinate system 202 is a Cartesian coordinate system. In some cases, the coordinate system is a polar, elliptical, or other non-Cartesian coordinate system. In some implementations, the display is a three dimensional display, and a third axis represents some other parameter of interest in assessing risk. Examples of a third parameter of interest in assessing risk include any of the parameters represented in the project timeline 100. The third dimension can represent different project managers who are managing the various projects represented in the display.

The display can include visual indication (e.g., color, lines, labels, texture, and/or others) of different levels of risk associated with different regions of the coordinate system 202. For example, regions of the coordinate system 202 near the origin of the example coordinate system 202 (0% probability, 0% slippage) can be identified as low risk regions, regions of the coordinate system 202 near the top right of the example coordinate system 202 (100% probability, 600% slippage) can be identified as high risk regions, and regions between the low risk regions and high risk regions can be identified as medium risk regions. In this example, a risk level for a project milestone can be identified based on the region where that project milestone's data point resides in the coordinate system 202. For example, the project milestone represented by the example data point 208a may be identified as a low risk milestone, and the project milestone represented by the example data point 208b may be identified as a high risk milestone.

In the example coordinate system 202, the horizontal lines of latitude and the vertical lines of longitude define multiple rectangular sections in the coordinate system 202. In some cases, each rectangular section can be associated with a level of risk. For example, each rectangular section can be numbered according to a risk level associated with the rectangular section. The numbering of the rectangular sections can be generated according to a variety of algorithms. For example, the numbering can begin at the origin of the coordinate system 202 and increase along the vertical direction, along the horizontal direction, along a diagonal, curved, or angled direction, or any combination.

Figure 3:
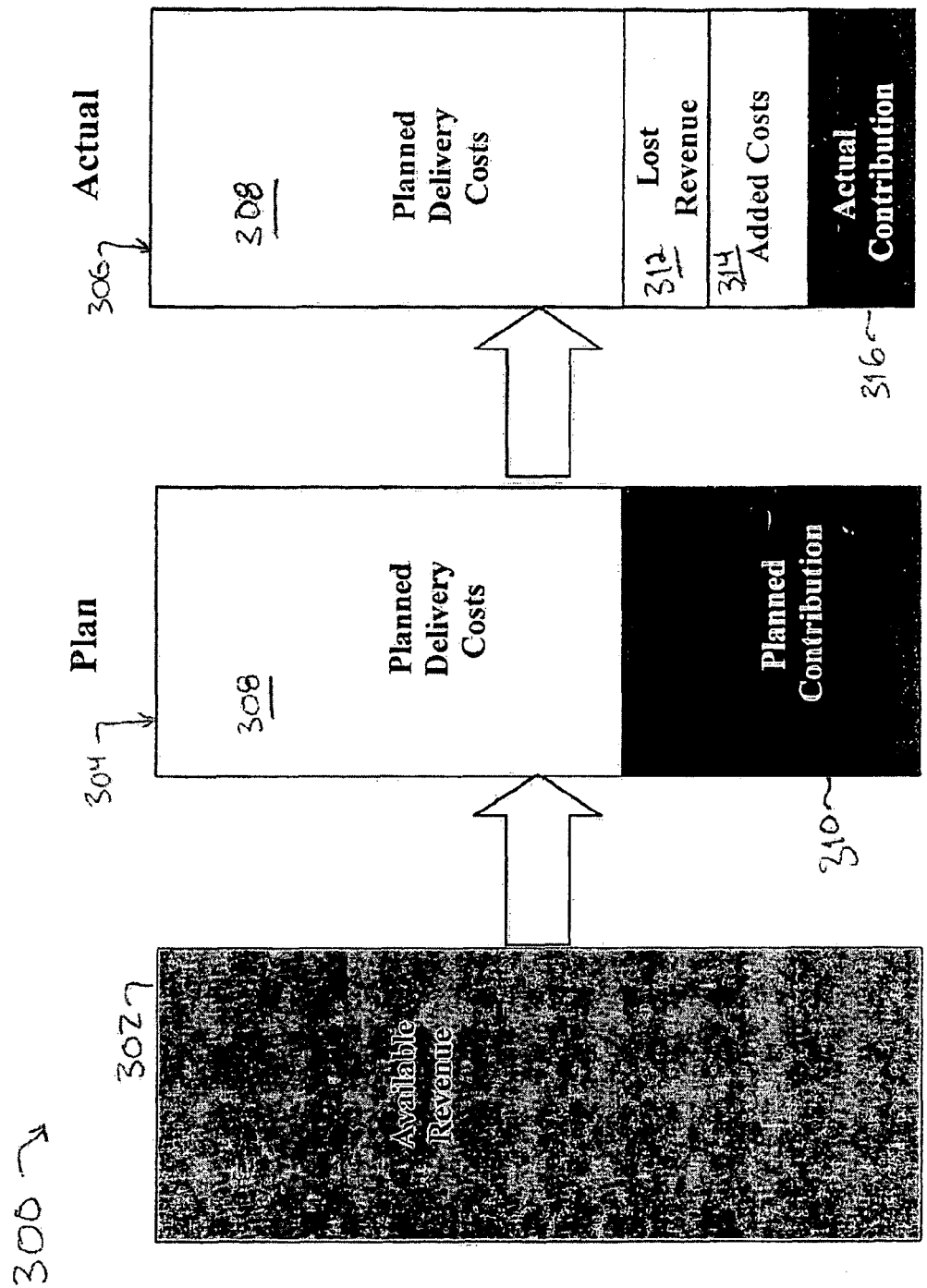
FIG. 3 is a diagram illustrating an example budget for a project.

FIG. 3 is a diagram illustrating relationships between costs and contributions in a budget 300 of an example project. The example budget 300 for an example project of an enterprise is based, at least in part, on an amount of available revenue 302. The available revenue 302, in some cases, can be the total resources available for the project. Examples of resources include money, time, equipment, all types of capital and assets, and others. In one example, available revenue 302 can represent an amount of money that a client or customer has paid or intends to pay to the enterprise for completion of the project. In the illustrated example budget, the available revenue 302 is broken down according to a budgeting plan 304, and the budgeting plan 304 is further broken down according to an actual budget 306. Represented in the planned budget 304 and the actual budget 306 are different types of costs and contributions. Contributions can represent the enterprise's profit or resource gain for the project. Costs can represent the enterprise's overhead or expenditures for the project. Example costs include financial costs, reputational costs, personnel costs, time costs, and other types of costs. A cost can be an arbitrarily pre-assigned value, a calculated value, a measured value, or an estimated value.

According to the plan budget 304, a first portion of the available revenue 302 is allocated to planned delivery costs 308, and a second portion of the available revenue 302 is allocated to planned contribution 310. The planned delivery costs 308 can represent the amount of resources the enterprise plans to spend in order to complete the project. The planned contribution 310 can represent the difference between the available revenue 302 and the planned delivery costs 308.

According to the actual budget 306, a portion of the planned contribution 310 is realized as actual contribution 316. However other portions of the planned contribution 310 are consumed by added costs 314 and lost revenue 312. For example, a client or customer may not pay the full amount of the available revenue 302, resulting in lost revenue 312. As another example, completing the project may require additional overhead beyond the planned delivery cost 308, resulting in added costs 314.

Figure 4:
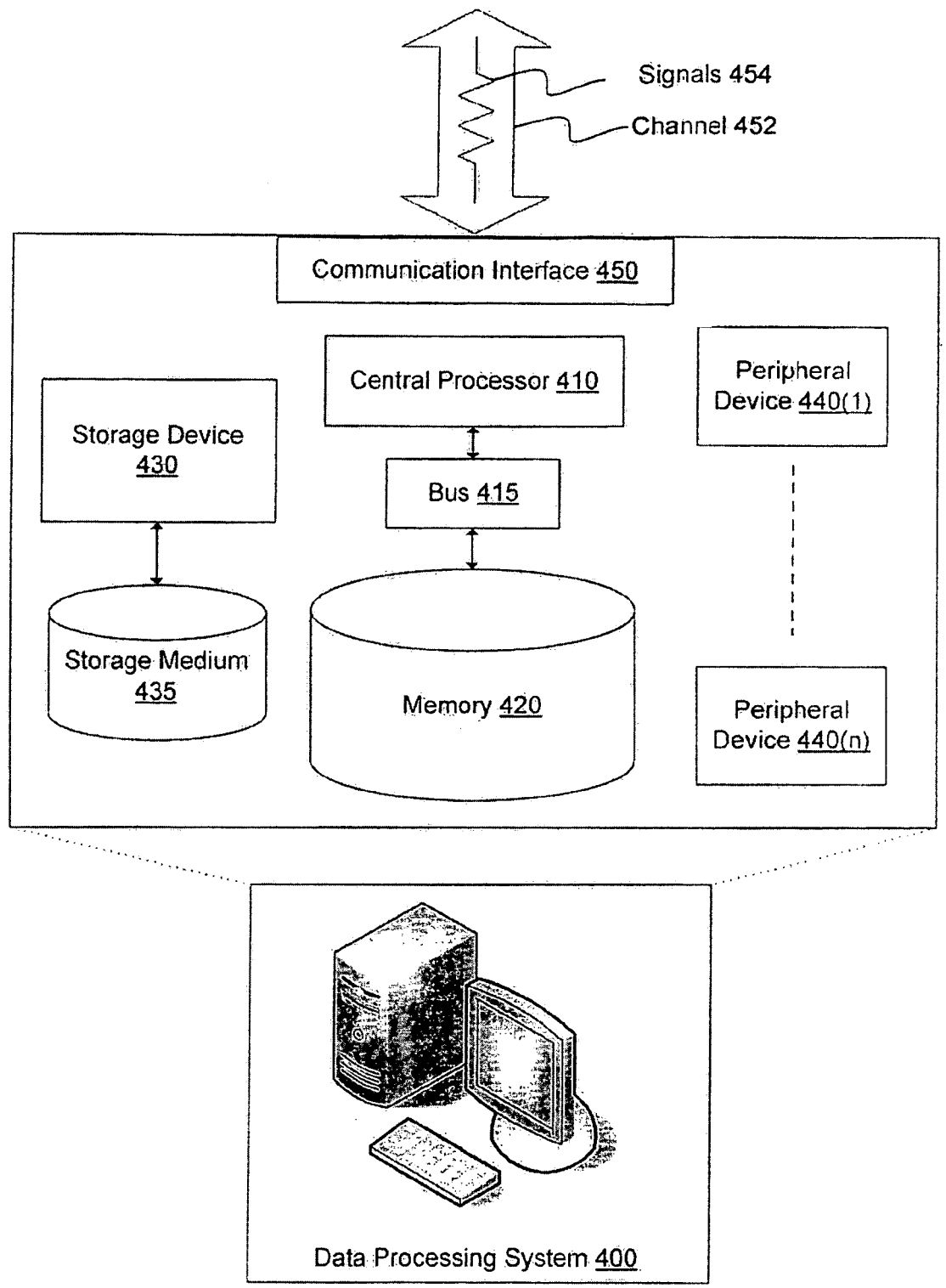
FIG. 4 is a diagram illustrating an example computer system for assessing risk.

FIG. 4 is a block diagram illustrating an example data processing system 400 in which a process for assessing risk can be implemented. The data processing system 400 includes a central processor 410, which executes programs, performs data manipulations, and controls tasks in the system 400. For example, the central processor 410 can calculate a probability of missing a future deadline based on an estimated amount of time slippage and an amount of time remaining until the future deadline. The central processor 410 is coupled with a bus 415 that can include multiple busses, which may be parallel and/or serial busses.

The data processing system 400 includes a memory 420, which can be volatile and/or non-volatile memory, and is coupled with the communications bus 415. For example, the memory 420 can store data related to a project timeline. The system 400 can also include one or more cache memories. The data processing system 400 can include a storage device 430 for accessing a storage medium 435, which may be removable, read-only, or read/write media and may be magnetic-based, optical-based, semiconductor-based media, or a combination of these. The data processing system 400 can also include one or more peripheral devices 440(1)-440(n) (collectively, devices 440), and one or more controllers and/or adapters for providing interface functions.

The system 400 can further include a communication interface 450, which allows software and data to be transferred, in the form of signals 454 over a channel 452, between the system 400 and external devices, networks, or information sources. For example, the communication interface 450 may receive information related to a project timeline and/or slippage information. The signals 454 can embody instructions for causing the system 400 to perform operations. The system 400 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 400 and/or delivered to the machine 400 over a communication interface. These instructions, when executed, enable the machine 400 to perform the features and functions described herein. These instructions represent controllers of the machine 400 and can be implemented in a high-level procedural and/or object-oriented programming language, and/or in assembly/machine language. Such languages can be compiled and/or interpreted languages.

Figure 5:
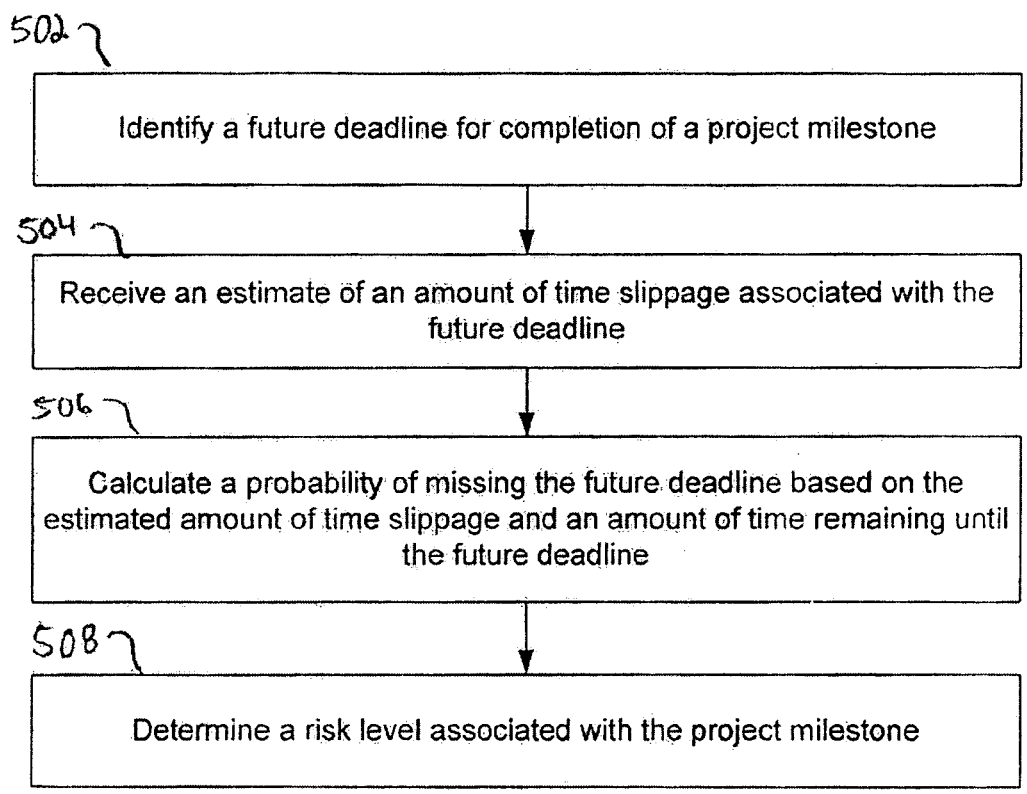
FIG. 5 is a flow chart illustrating an example process for assessing risk.

FIG. 5 is a flow chart illustrating an example process 500 for assessing risk. The process 500 can be used for assessing risk related to one or more project milestones and/or an entire project. In some implementations, the process 500 includes additional, fewer, and/or different operations.

At 502, a future deadline for completion of a project milestone is identified. In some cases, the future deadline for completion of a project milestone is a future deadline for completion of the project. The future deadline may be identified by retrieving stored data relating to the timeline. In some cases, a project timeline is generated, and the future deadline is identified based on the timeline. In some cases, the project milestone is a current milestone, and in other implementations, the project milestone is a future project milestone. In some cases, an amount of time remaining until the future deadline is calculated. For example, the amount of time remaining until the future deadline can be the number of days between a current date and the date of the future deadline. In other examples, the amount of time can be a number of minutes, hours, weeks, months, years, or any other measure of time between a first time and the time of the future deadline. The first time can be a past, present, or future time. For example, the first time can be a risk entry date, when risk is assessed and/or when one or more risk-assessment parameters are entered and/or updated.

At 504, an estimate of an amount of time slippage associated with the future deadline is received. The amount of time slippage can be milestone slippage associated with the project milestone or project slippage associated with the project. The estimate of the amount of slippage can be received in a number of ways. For example, the estimate of the amount of time slippage can be received by manual entry, by an automated process or calculation, by a data transmission from a remote system, over a network or other communication interface, by a database or software application, and/or others. In some implementations, slippage can be estimated by a project manager or another person involved with or supervising the project. In some implementations, slippage can be calculated by an automated process. For example, slippage can be calculated on a computer or another suitable information processing device. Slippage can be calculated based on slippage for other milestones (e.g., previous milestones and/or future milestones) in the project, total slippage for the project, slippage for milestones in other projects, total slippage for other projects, and/or other factors.

In one example, data identifying the time of a current milestone baseline is received over a network from a remote server, and data identifying the forecasted time of milestone finish is received from a project manager's scheduling software application or by manual entry by the project manager.

The milestone forecast data can be used to calculate milestone slippage, and the project forecast finish data can be used to calculate project slippage. In other cases, the slippage is not calculated based on a forecasted time of milestone finish. In such cases, the slippage can be calculated by another method as described above, and a forecasted finish time can be calculated based on the milestone time available, the slippage, and possibly other data.

At 506, a probability of missing the future deadline is calculated based, at least in part, on the estimated amount of time slippage and an amount of time remaining until the future deadline. In some cases, the probability is calculated based on a ratio of the estimated amount of time slippage and an amount of time to complete the project milestone. For example, the probability can be calculated based, at least in part, on equation (1) or (2) above. In some cases, the amount of time to complete the project milestone includes a sum of the time remaining until the future deadline and the estimated amount of time slippage.

At 508, a risk level associated with the project milestone is determined. The risk level can be determined based on the calculated probability and a measure of a cost associated with missing the future deadline. An example of a measure of a cost includes financial cost, reputational cost, anticipated slippage for the entire project, and/or others. In some cases, the cost can be calculated based on information in a project timeline, for example, according to equations (3) and (4) above. In other cases, the cost is estimated by a manager, and is not based on timeline data. For example, the manager may know the cost associated with missing the future deadline based on the manager's own experience or based on details of the project. In some cases, the risk level is determined based on a multiplicative product of the probability and the measure of the cost. In other cases, the risk level is determined according to another formula. For example, a risk level for a certain project can be determined by plotting risk data for multiple projects in a coordinate system 202 and comparing the risk data for the certain project with the risk data for the other projects.

In some implementations, a programmable processor is programmed to perform one or more operations based at least in part on the method 500. For example, in some implementations, the determined risk level is compared to one or more thresholds, and a notification is issued based on the comparison. If a risk level exceeds some critical level, the project manager, the project manager's supervisor, and/or an automated system can be notified. In some implementations, notifications of risks or likelihood of missing a deadline are automatically provided, for example, to a project manager, a supervisor, and/or an automated system. In some implementations, project budget data is automatically updated in a database, for example, based on the slippage, the determined risk level, and/or other data. In some implementations, risks or costs may be quantified according to pre-determined standards, for example, based on the slippage, the determined risk level, and/or other data. In some implementations, project schedules may be automatically updated, for example, based on the slippage or other data related to scheduling. In some implementations, resources may be reallocated among projects or data for resource allocation may be provided, for example, to a project manager, a supervisor, and/or to an automated system. In some implementations, the source of the risk associated with like milestones is summarized to identify recurring risks for which enterprise level solutions can be implemented to effect economies of scale. In some implementations, the risk magnitudes can be summarized according to one or more categories. For example, risk may be summarized according to project manager, geographic region, business type, industry sector, or another category to effect economic mitigation.

One or more of the operations included in the process 500 can be implemented using a scheduling software tool to identify deadlines, milestones, baselines, other relevant times, and/or other information. Example scheduling software tools include Microsoft Project, Primavera, Artemis, and others. One or more of the operations included in the process 500 can be implemented using a database tool. For example, a database tool may be used to perform functions including identifying possible future slippage, identifying an amount of slippage expected, determining probabilities and impacts of slippage, performing calculations based on one or more of Equations (1) through (4) above, and/or determining a risk index value to prioritize risk. Example database modules include Oracle, Access, SQL Server, Microsoft SharePoint, and others.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. Accordingly, other implementations are within the scope of the following claims.

What is claimed is:
1. A method for assessing risk, the method comprising:
identifying a future deadline for completion of at least one project milestone;
receiving an estimate of an amount of time slippage associated with the future deadline;
calculating, with a computer, a probability of missing the future deadline, wherein the probability of missing the future deadline is calculated by dividing the estimated amount of time slippage by a sum of a time remaining until the future deadline and the estimated amount of time slippage;
calculating, by the computer, a percent of milestone slippage by dividing the time slippage associated with the project milestone by a sum of a milestone elapsed time and the time remaining until the future deadline of the milestone;
presenting, by the computer, on a user interface a coordinate system comprising a first dimension representing a range of probabilities of missing the future deadline and a second dimension representing a range of percent of milestone slippage;
plotting, by the computer, a data point representing each project milestone in the coordinate system where a value in the first dimension is the calculated probability of missing the future deadline and a value in the second dimension is the calculated percent of milestone slippage;

defining a first region, a second region, and a third region in the coordinate system; and determining, by the computer, a risk level for each project milestone based on the location of each data point being in either the first region, the second region, or the third region in the graph.

2. The method of claim 1, wherein the milestone elapsed time is a time between a predecessor milestone and a risk entry date.

3. The method of claim 1, further comprising identifying a project timeline, wherein the future deadline comprises one of a plurality of future deadlines for the project timeline.

4. The method of claim 1, wherein the future deadline comprises a future date.

5. The method of claim 4, wherein the amount of time remaining until the future deadline is the number of days between a current date and the future date.

6. A computer program product, tangibly stored on a non-transitory computer-readable medium, comprising instructions operable to cause a programmable processor to:

retrieve stored data identifying a future deadline for completion of at least one project milestone;

receive an estimate of an amount of time slippage associated with the at least one project milestone;

calculate a probability of missing the future deadline, wherein the probability of missing the future deadline is calculated by dividing the estimated amount of time slippage by a sum of a time remaining until the future deadline and the estimated amount of time slippage;

calculate a percent of milestone slippage by dividing the time slippage associated with the project milestone by a sum of a milestone elapsed time and the time remaining until the future deadline of the milestone;

present on a user interface a coordinate system comprising a first dimension representing a range of probabilities of missing the future deadline and a second dimension representing a range of percent of milestone slippage;

plot a data point representing each project milestone in the coordinate system where a value in the first dimension is the calculated probability of missing the future deadline and a value in the second dimension is the calculated percent of milestone slippage;

define a first region, a second region, and a third region in the coordinate system; and determine a risk level for each project milestone based on the location of each data point being in either the first region, the second region, or the third region in the graph.

7. The computer program product of claim 6, wherein the data point comprises a color coded representation determined according to a risk level associated with the project milestone.

8. The computer program product of claim 6, further comprising instructions operable to cause the programmable processor to:

calculate a risk of encountering a cost associated with missing the future deadline by multiplying a cost associated with missing the future deadline by the probability of missing the future deadline; and compare the risk of encountering the cost associated with missing the future deadline to one or more thresholds.

9. The computer program product of claim 8, further comprising instructions operable to cause the programmable processor to issue a notification based on the comparison of the risk of encountering the cost and the one or more thresholds.

10. A data processing apparatus including a processor and a non-transitory machine-readable medium storing thereon machine executable instructions for causing the processor of the data processing apparatus to perform operations comprising:

identifying a future deadline for completion of at least one project milestone;

receiving an estimate of an amount of time slippage associated with the project milestone;

calculating a probability of missing the future deadline, wherein the probability of missing the future deadline is calculated by dividing the estimated amount of time slippage by a sum of a time remaining until the future deadline and the estimated amount of time slippage;

calculating a percent of milestone slippage by dividing the time slippage associated with the project milestone by a sum of a milestone elapsed time and the time remaining until the future deadline of the milestone;

presenting on a user interface a coordinate system comprising a first dimension representing a range of probabilities of missing the future deadline and a second dimension representing a range of percent of milestone slippage;

plotting a data point representing each project milestone in the coordinate system where a value in the first dimension is the calculated probability of missing the future deadline and a value in the second dimension is the calculated percent of milestone slippage;

defining a first region, a second region, and a third region in the coordinate system; and determining a risk level for each project milestone based on the location of each data point being in either the first region, the second region, or the third region in the graph.

* * * * *